United States Patent Office 3,369,562
Patented Feb. 20, 1968

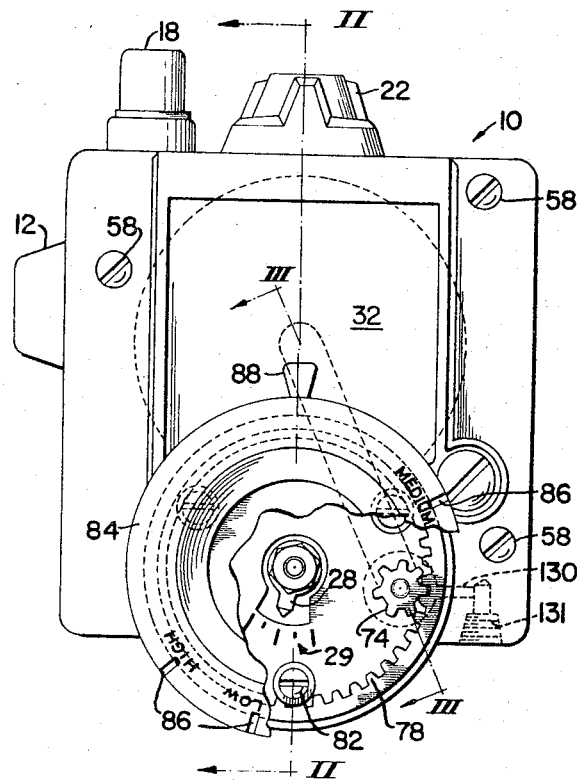
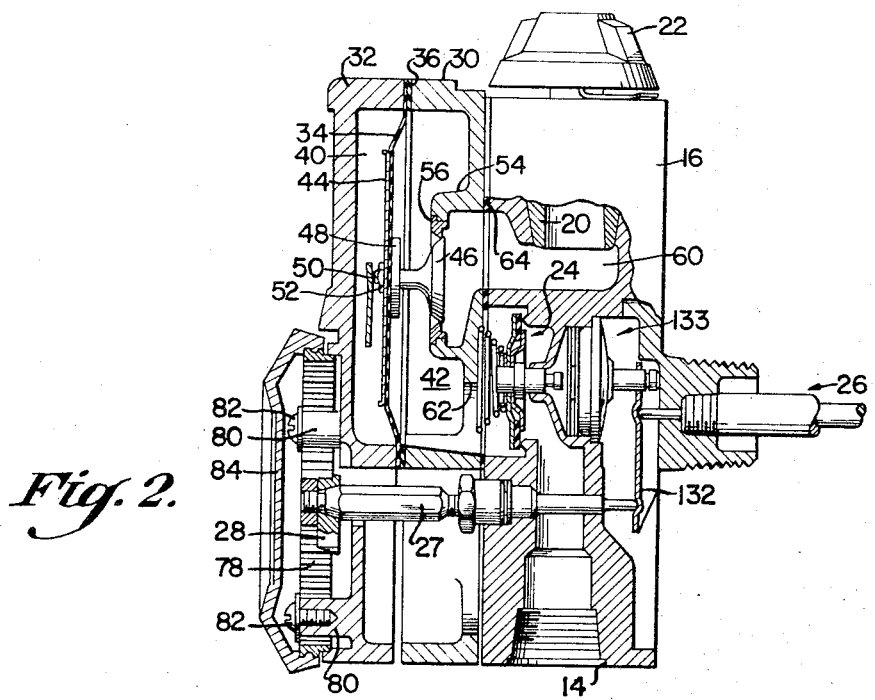
Fig. 1.
Fig. 2.

3,369,562
PRESSURE REGULATOR
Michael J. Caparone, Arcadia, and Theodore J. Dykzeul, Rolling Hills, Calif., assignors to Robertshaw Controls Company, Richmond, Va., a corporation of Delaware
Original application Nov. 29, 1962, Ser. No. 243,968, now Patent No. 3,159,346, dated Dec. 1, 1964. Divided and this application Sept. 28, 1964, Ser. No. 399,679
4 Claims. (Cl. 137—505.38)

This invention relates to pressure regulators for providing variable recovery rates for an appliance. More particularly, this invention relates to pressure regulators for varying the input rate and the fuel pressure at a burner in response to the temperature of the medium heated by the burner as determined by the rate of draw-off of the medium.

This application is a divisional application of copending application, Ser. No. 243,968, filed Nov. 29, 1962, now Patent No. 3,159,346, which application is a continuation of its copending application, Ser. No. 862,694, filed Dec. 29, 1959, now abandoned, and assigned to the same assignee.

Prior devices used to control the fuel flow to a burner for heating a water supply tank have controlled the fuel flow by manual and thermostatic operation. In these devices, a thermostat is situated in the water supply tank and intermittently operates a valve which controls the fuel flow to the burner, thus maintaining the water in the supply tank at a desired temperature.

However, during certain periods of the day when there is a large demand and a correspondingly large drawoff of water from the supply tank, the burner cannot restore the temperature of the water within the tank to the desired value with sufficient rapidity and the result is a drawoff of water at a temperature below that desired. To remedy this situation, it has been necessary to set the control point temperature of the thermostat at a higher value, usually by operation of a temperature adjustment knob provided externally of the controlled device. Subjecting the tank to high water temperatures greatly decreases the life of the tank.

Other prior art devices, in attempting to compensate for large irregular drawoffs, have disclosed a plurality of heaters, gas burners or electrical resistance elements, or a plurality of valves which are operated sequentially by a plurality of thermostats disposed at different positions in a water supply tank. Due to the multiplicity of parts in these devices, bulky and expensive controls have resulted.

An object of this invention is to effectively compensate for variations in demand by varying the fuel input rate to a burner.

Another object of this invention is to allow the fuel input rate to a hot water heater to be adjusted or controlled manually in accordance with the rate of use of the hot water.

In the preferred embodiment of this invention, a casing with a fluid flow passage having an inlet and an outlet is provided with a valve disposed therebetween which is operable in response to an external condition for controlling the rate of fluid flow to the outlet. Pressure regulating means is provided for controlling the pressure of the fluid flow through the passage of the casing. A resilient means is operatively connected to the controlling means and determines the pressure of fluid flow therethrough. The valve is operatively connected to an external adjusting means to regulate the fluid flow rate to the outlet of the casing.

These and other objects and advantages of this invention will become apparent from the following detailed description taken in connection with the accompanying drawings wherein:

FIG. 1 is a front elevation of the control device embodying this invention with the pressure control knob partially broken away;

FIG. 2 is a partial sectional view taken on lines II—II of FIG. 1;

Figure 3:
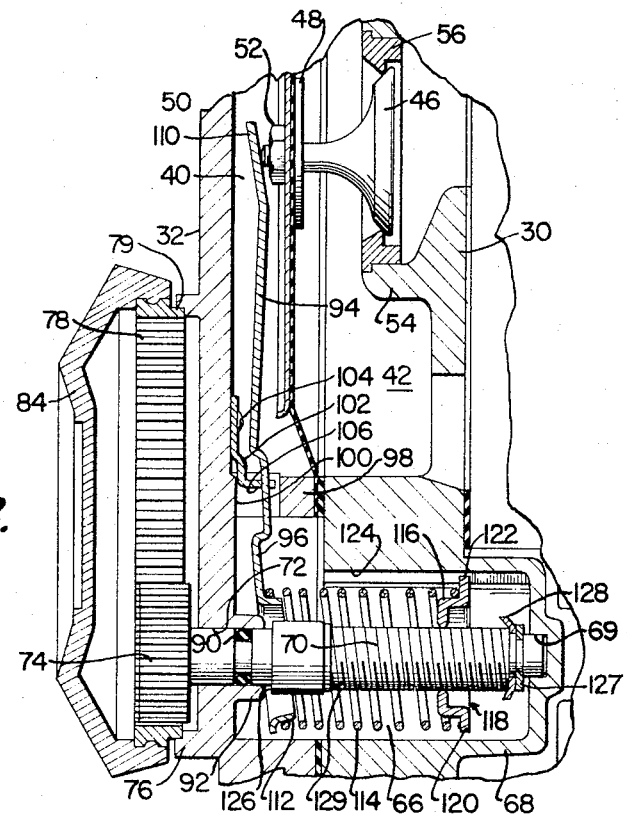
FIG. 3 is an enlarged sectional view taken on lines III—III of FIG. 1.

Referring more particularly to the embodiment of this invention shown in FIGS. 1-3, a fluid flow control device 10 is provided with an inlet 12 and an outlet 14 which are adapted to be connected to supply fuel to a domestic water heater burner or similar apparatus. The control device 10 comprises a basic casing 16 housing the control elements which include a conventional thermo-electrically operated safety valve (not shown) having a manual reset button 18, a gas cock 20, and a thermostatically operated valve 24. The gas cock 20 is provided with a dial 22 for manual operation thereof and contains appropriate openings for controlling fluid flow to the main burner of the water heater and also for controlling fluid flow to a pilot burner for the main burner. The thermostatically operated valve 24 is operable between open and closed positions in response to a predetermined temperature sensed by a rod and tube assembly 26 of a type well known in the art. A temperature adjustment means is provided for the thermostatically operated valve 24 and takes the form of a shaft 27 having an adjustment stop with a pointer 28 which is adapted to cooperate with temperature calibration markings 29 placed directly on the cover section 32.

Regulating means is provided for controlling the fluid flow between gas cock 20 and the thermostatically operated valve 24. To this end, a subassembly is provided comprising a valve seat section 30 and the cover section 32. A circular diaphragm 34 and a gasket 36 are disposed between the valve seat section 30 and the cover section 32 and a pair of screws (not shown) hold the sections together to compress the gasket and the circumferential edge of the diaphragm 34 to form a fluid-tight connection. The diaphragm 34 forms a partition between the valve seat section 30 and the cover section 32 to define a chamber 40 and a chamber 42 on either side of the diaphragm. The diaphragm 34 is of flexible material impermeable to gas. A circular diaphragm pan 44, having a smaller diameter than the diameter of the diaphragm 34, is mounted on one side of diaphragm 34.

A valve member 46 is provided with a circular shoulder 48 disposed on the stem thereof and a threaded portion 50 extends from the central portion of shoulder 48 through apertures disposed centrally in the diaphragm 34 and the diaphragm pan 44. A nut 52 is tightened on threaded portion 50 to fasten the valve member 46 to the diaphragm 34 in a fluid-tight manner. The valve seat section 30 is provided with a hollow boss 54 having a circular valve seat 56 press-fitted and staked into place. The valve seat 56 has a smaller diameter than valve 46 and is cooperable therewith to regulate fluid flow through the control 10.

The subassembly is connected to the basic casing 16 by screws 58 extending through the cover section 32 and the valve seat section 30 into the casing 16. This aligns the passage within boss 54 with a passage 60 leading from the open end of gas cock 20. It is now apparent that fluid flow from the gas cock 20 must flow past valve seat 56, chamber 42, and an opening 62 formed in the valve seat section 30 adjacent boss 54 before reaching the thermostatically operated valve 24 and subsequently outlet 14. A suitable gasket 64 is compressed between valve seat section 30 and the basic casing 16 to prevent external and internal leakage between the separate passageways.

As shown in FIG. 3, valve seat section 30 and cover section 32, when connected to the casing 16, define a substantially cylindrical smooth-walled adjustment chamber 66 located in the lower portion of the control device 10. A projecting portion 68 of the valve seat section 30 extends into a matching cavity in the basic casing 16.

The projecting portion 68 is provided with a centrally disposed recess 69 and an adjusting screw 70 has one end journaled therein. The adjustment screw 70 extends along the longitudinal axis of chamber 66 and through a cylindrical aperture 72 formed in the cover section 32.

A pinion gear 74 for rotating the adjustment screw 70 is disposed externally of the cover section 32 and is secured to the outwardly extending end of adjustment screw 70 by any suitable means, such as a press-fit or a nut (not shown). An annular boss 76 is centrally positioned at the lower portion of cover section 32 and an annular internal gear 78 is provided with a peripheral bearing portion 79 engaging the inner wall of boss 76. The internal gear 78 is free to rotate relative to boss 76 and the internal teeth of the gear cooperatively engage the teeth of pinion gear 74. Suitably spaced bosses 80 extend outwardly from cover section 32 adjacent the teeth of internal gear 78. A screw 82 is threaded into each boss 80 and the head of each screw is sufficiently large to overlap the teeth of the internal gear 78 to rotatably mount the gear in place on boss 76.

A cup-shaped selector knob 84 is snap-fitted to the outer peripheral wall of internal gear 78. The selector knob 84 is provided with notches 86 and suitable indicia positioned thereon for cooperation with an indicator 88 disposed centrally of the front face of cover section 32 and adjacent the periphery of the selector knob 84 to indicate the position of the same.

An annular groove is located in the adjustment screw 70 and a sealing ring 90 is positioned therein for cooperation with an internal portion of an apertured boss 92 extending inwardly from the cover section 32. A lever 94 has a flanged semicircular slot in end 96, which slot is of sufficient width to clear the outer diameter of the apertured boss 92, and adjustment screw 70. A wall 98 of the cover section 32 is adapted to separate the chamber 40 from the adjustment chamber 66 and is provided with an opening 100 through which lever 94 extends. A substantially triangular-shaped member 102 is fastened to the cover section 32 by suitable means, such as a rivet 104, and is provided with an inwardly extending lip 106 having projections which are received in edge slots (not shown) in lever 94 and serve as a fulcrum therefor. The other end 110 of lever 94 engages the threaded projection portion 50 of valve member 46.

The slotted end 96 of lever 94 has an inturned flange 112 which internally mounts one end of a helical coil spring 114. The coil spring 114 is coaxial with adjustment screw 70 and has its other end internally mounted on a centrally recessed dome 116 of an annular member 118. The peripheral edge portion 120 of annular member 118 is provided with a projection forming a key 122 which extends into a keyway 124 formed in the wall of the adjustment chamber 66 and extends parallel to the longitudinal axis thereof. The adjustment screw 70 is threadedly received by the inner wall of the recessed dome 116 and is adapted to move the annular member 118 longitudinally when the adjustment screw 70 is rotated by manual rotation of selector knob 84.

An annular shoulder 126 is provided on the adjustment screw 70 and is adapted to engage boss 92. When the valve seat section 30 and the cover section 32 are assembled, the adjustment screw 70 is free to rotate but the end of the adjustment screw 70 cannot be retracted from the recess 69.

A stop member 128, formed as a cup-shaped washer, is held in place by a C washer 127 crimped into an annular groove formed adjacent the end of the adjustment screw 70. Stop member 128 is adapted to engage the annular member 118 to prevent further extension of the coil spring 114. An imperfect thread 129, located adjacent the outer extremity of the threaded portion of the adjustment screw 70, is adapted to limit outward movement of the annular member 118 to prevent further compression of the coil spring 114.

The valve seat section 30, as shown in FIG. 1, is provided with a passageway 130 communicating with the innermost end of the adjustment chamber 66. Air is bled from chamber 40 through adjustment chamber 66 to passage 130 and subsequently out of the bleed connection 131 shown in dotted lines at the lower right corner of FIG. 1. An appropriately sized orifice is drilled in the valve seat section, or alternatively, a plug (not shown) with an appropriately sized orifice is fastened in the bleed connection 131.

During operation of the embodiment shown in FIGS. 1–3, gas flows from a suitable source through the inlet 12 and past a thermoelectrically operated safety valve (not shown) to the gas cock 20. The gas cock 20 is manually operated by dial 22 to control gas flow to a pilot burner through appropriate passages (not shown) and to control gas flow through the end of gas cock 20 into passage 60. Gas flow from passage 60 is then regulated by valve 46 and proceeds through diaphragm chamber 42 and opening 62 to the thermostatically operated valve 24.

The thermostatically operated valve 24 is operable between open and closed positions by the rod and tube assembly 26 which is responsive to an external condition, such as a temperature of water in a tank, to control fluid flow through outlet 14 to the main burner (not shown) situated in heating relationship to the water tank. The temperature at which the valve 24 is operated is set by rotating pointer 28 relative to markings 29, both of which are concealed by the snap-on selector knob 84. Rotation of pointer 28 varies the position of shaft 27 and a lever 132 which is adapted to engage the rod and tube assembly 26. Expansion of the rod and tube assembly 26 is transmitted through the lever 132 to valve 24 by a clicker assembly 133 of a type well known in the art.

The diaphragm mounted valve 46 is responsive to the difference in pressure between passage 60 and diaphragm chamber 42, to thereby regulate the pressure in the control device 10 in the conventional manner.

Air is bled from chamber 40 through adjustment chamber 66, passage 130, and bleed connection 131. The drilled orifice in the valve seat section 30 or the orifice plug (not shown) disposed in bleed connection 131 is used to retard the regulator response upon opening of the thermostatic valve 24 to prevent initial overgassing of the main burner. This orifice also provides a dampening effect to prevent regulator vibration at low flows on low capacity burner applications.

Under normal hot water demand conditions, the "low" indicia on selector knob 84 is positioned adjacent indicator 88 and the coil spring 114 extends substantially the full length of adjustment chamber 66. Thus, only a small biasing force is transmitted by lever 94 to valve member 46 and there is relatively low pressure fluid flow through the valve 46 resulting in a relatively low input rate to the burner.

When there is a high demand for hot water, selector knob 84 is rotated in a clockwise direction through approximately 320° until the "high" indicia is adjacent indicator 88. This rotation of selector knob 84 causes movement of internal gear 78 therewith to rotate pinion gear 74 in a clockwise direction. Since pinion gear 74 is connected to adjustment screw 70, the adjustment screw will be rotated in clockwise direction to move the annular member 118 longitudinally toward the cover section 32, thereby compressing regulator spring 114. Key 122, disposed in keyway 124, prevents rotational movement of the annular member 118. As the regulating spring 114 is compressed, it exerts a force on end 96 to pivot lever 94 in a clockwise direction. End 110 of lever 94 exerts a force on threaded portion 50 to move the valve member 46 away from valve seat 56, thereby increasing the gas pressure.

The increased gas pressure and resultant increased burner input rate will cause increased recovery rate of the water heater to compensate for the high demand for hot water. By changing the input rate to the burner rather than the temperature setting, more effective compensation results and the water heater tank is subjected to a relatively lower maximum temperature which has the effect of increasing tank life.

It is apparaent that selector knob 84 may be rotated to any position between the indicia "high" and the indicia "low" to provide a burner input rate corresponding to the hot water demand. By using an internal gear and pinion gear, a relatively low rate regulator spring can accomplish accurate regulation while still confining the required range of adjustment of selector knob 84 to less than 360°. The unused portion of the internal gear 78 between the "high" and "low" positions has the corresponding teeth of the internal gear in contact with the pinion gear either filled or solid to prevent an incorrect rotation of the selector knob 84 outside its calibrated range.

Figure 4:
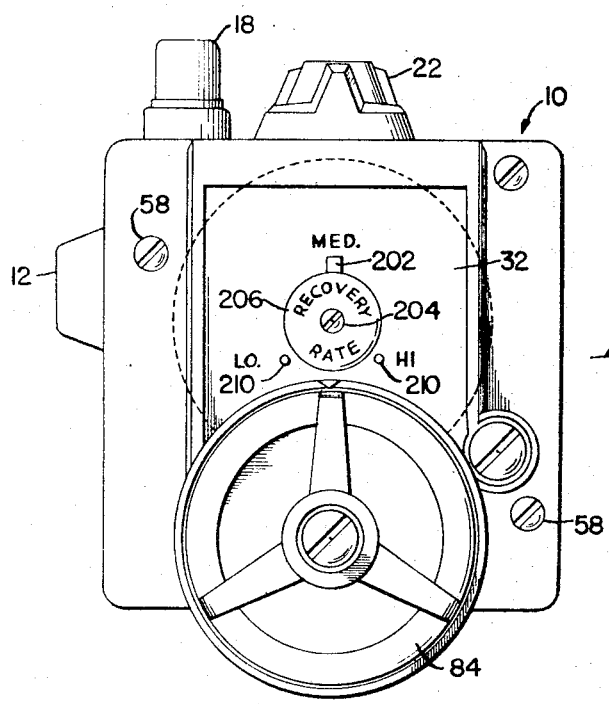
FIG. 4 is a front elevation view of another embodiment of this invention.
Figure 5:
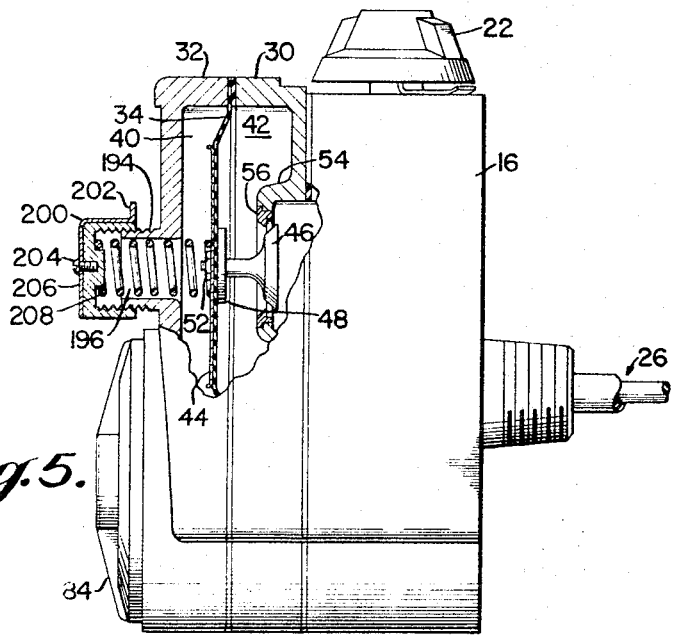
FIG. 5 is a partial cut-away side elevation view of the embodiment of the invention shown in FIG. 4.

The embodiment of the invention shown in FIGS. 4 and 5, wherein corresponding structural members previously described are given like reference numerals, is similar to the prior embodiment; but differs therefrom in that a manual adjusting cap assembly is used in place of the cooperating adjusting screw 70, pinion gear 74 and lever 94 of FIGS. 1–3, to adjust the valve lift of valve member 46 to the valve seat 56, to thereby vary the gas pressure in chamber 42.

A threaded boss 194 is centrally located on the outer surface of cover section 32 and has a concentrically disposed aperture 196 bored therein which communicates with chamber 40. A cup-shaped adjustment cap 200, having matching internal threads, is threaded to boss 194 so as to enclose the opening therein. Cover 206, having an integral pointer 202, is secured to the adjustment cap 200 by screw 204. Helical compression spring 208 is disposed between the adjustment cap 200 and the circular diaphragm pan 44 of the circular diaphragm 34. Spring 208 has an outer diameter which is less than the diameter of the aperture 196 in the boss 194 and an inner diameter which is sufficiently large so as to accommodate nut 52.

The biasing force of spring 208 can be adjusted by rotation of adjustment cap 200 on threaded boss 194 to calibrate the control device for a specific burner application. Once the calibration is made, cover 206 is secured to the adjustment cap 200. Pointer 202 will engage stops 210 at either the "lo" or the "hi" positions, thus determining the approximate range of the burner recovery rate.

In operation, if a large drawoff is expected in the water heater (not shown), the cover 206 is rotated in a clockwise direction towards "hi." Spring 208 is further compressed to bias the circular diaphragm pan 44, thereby displacing valve member 46 from the valve seat 56, thus opening the valve. As the distance between valve member 46 and valve seat 56 is increased, the throttling action of the pressure regulating valve member 46 is decreased, whereby the gas pressure in chamber 42 is increased to more nearly approach the inlet pressure.

As previously described relative to FIGS. 1 through 3, an increase in pressure in chamber 42 will increase the rate of flow of fluid through the thermostatically operated valve 24 (not shown) when it is in the open position. In this manner, the gas pressure will cause an increased burner input rate which results in an increased recovery rate of the water heater to compensate for the high demand for hot water.

Although not specifically shown in FIG. 4 or 5, adjustment of the selector knob 84 will determine the operating temperature condition of the thermostatically operated valve 24.

Although the foregoing description has been described with reference to the control of a system utilizing a liquid type medium having a supply tank, it will be apparent that modifications can be made to adapt the structure to the control of space heating and central heating units employing either a liquid or gaseous heating medium. Variations in structure, as well as operation, can be effected without departing from the scope of this invention as defined by the following claims.

While the form of the invention now preferred has been disclosed as required by the statutes, other forms may be used, all coming within the scope of the claims which follow:

What is claimed is:

1. A pressure regulator comprising a housing having an inlet and an outlet interconnected together by a valve seat, said housing having spaced stopped means thereon, a valve member for opening and closing said valve seat, a flexible diaphragm interconnected to said valve member for controlling movement of said valve member, said housing having a tubular portion, spring means disposed in said tubular portion and having one end engaging said diaphragm to tend to move said valve member to its open position, and a cup-shaped control knob external to said housing and engaging the other end of said spring means whereby movement of said control knob relative to said housing varies the pressure at said outlet, said control knob having an outer end wall, said control knob having a plate rotatably mounted to said end wall by a threaded fastening member disposed centrally through said end wall and said plate and having an integral indicating pointer disposed between said stop means to not only indicate the setting of said control knob relative to said housing but also to engage said stop means to limit movement relative to said housing.

2. A pressure regulator as set forth in claim 1 wherein said control knob is threadedly interconnected to said tubular portion of said housing.

3. A control device as set forth in claim 2 wherein said control knob has said indicating pointer extending along the side wall thereof and extending outwardly therefrom adjacent the open end of said knob.

4. A pressure regulator as set forth in claim 1 wherein said spring means comprises a coiled compression spring and wherein said control knob has means for positioning said other end of said spring means.

References Cited

UNITED STATES PATENTS

| 386,043 | 7/1888 | Timlin | 137—505.41 |
| 1,231,293 | 6/1917 | Peters | 137—505.41 |
| 1,769,132 | 7/1930 | Gwisdalla | 137—505.41 |

FOREIGN PATENTS

| 69,315 | 9/1925 | Sweden. |

WILLIAM F. O'DEA, *Primary Examiner.*

H. WEAKLEY, *Assistant Examiner.*